United States Patent [19]

Phung et al.

[11] Patent Number: 4,977,557
[45] Date of Patent: Dec. 11, 1990

[54] METHOD OF PROVIDING EFFECTIVE PRIORITY ACCESS IN A DUAL BUS SYSTEM

[75] Inventors: Van P. T. Phung, Ottawa; Rungroj Kositpaiboon, Nepean, both of Canada

[73] Assignee: Northern Telecom Limited, Montreal, Canada

[21] Appl. No.: 450,792

[22] Filed: Dec. 14, 1989

[51] Int. Cl.$^5$ ............................................. H04J 3/12
[52] U.S. Cl. .................................. 370/85.6; 340/825.5
[58] Field of Search ...................... 370/79, 85.6, 85.7, 370/85.9, 85.11, 85.12, 85.15, 94.1; 340/825.5, 825.51

[56] References Cited

U.S. PATENT DOCUMENTS

| | | | |
|---|---|---|---|
| 4,922,244 | 5/1990 | Hullett et al. | 340/825.5 |
| 4,926,418 | 5/1990 | Cidon et al. | 370/85.15 |
| 4,942,569 | 7/1990 | Maeno | 370/85.6 |

OTHER PUBLICATIONS

Proposed Standard: DODB Metropolitan Area Network, IEEE 802.6-89/45 Draft, Aug. 7, 1989, pp. 2, 2.1-2.1.2.2.
"Improving DQDB Fairness", by E. L. Hahne et al., American Telephone and Telegraph, Contribution to the IEEE 802.6 Working Group, Document No.: 802.6/89/, dated Sep. 8, 1989.
"A Problem in the Multi-Priority Implementation of the Bandwidth Balancing Mechanism" by Michael Spratt, Hewlett-Packard Information Systems Centre, Contribution to the IEEE 802.6 Working Group, IEEE pp. 802.6-89/61, dated Nov. 3, 1989.

Primary Examiner—Douglas W. Olms
Assistant Examiner—Melvin Marcelo
Attorney, Agent, or Firm—Dallas F. Smith

[57] ABSTRACT

A method provides effective priority access in a system having dual unidirectional and oppositely oriented buses. The method is intended to enhance the proposed standard, DQDB Metropolitan Area Network. An effectiveness factor K is introduced to enhance the effectiveness of the priority. In one embodiment lower priority CD counters are incremented by K for each higher priority request. A second embodiment also increments lower priority RQ counters. A third embodiment increments the lower priority CD slots only for the highest request received in a given slot. A fourth embodiment also increments lower priority RQ counters. A variation provides a threshold counter for controlling the use of the effectiveness factor.

11 Claims, 4 Drawing Sheets

Fig. 8

| | STATION A | | | | | | | | STATION B | | | | | | | |
|---|---|---|---|---|---|---|---|---|---|---|---|---|---|---|---|---|
| PRIORITY | 3 | | 2 | | 1 | | 0 | | 3 | | 2 | | 1 | | 0 | |
| COUNTER | RQ | CD | RQ | CD | RQ | CD | RQ | CD | RQ | CD | RQ | CD | RQ | CD | RQ | CD |
| ACTIVE | X | | X | X | X | | X | | X | X | X | | X | X | X | X |
| PR 3 REQ | +1 | | | +K | +1 | | +1 | | +1 | | +1 | | | +K | | +K |
| PR 2 REQ | | | +1 | | +1 | | +1 | | | | +1 | | | +1 | | +1 |
| PR 1 REQ | | | | | +1 | | +1 | | | | | | +1 | | | +1 |
| PR 0 REQ | | | | | | | +1 | | | | | | | | +1 | |

Fig. 9

| | STATION A | | | | | | | | STATION B | | | | | | | |
|---|---|---|---|---|---|---|---|---|---|---|---|---|---|---|---|---|
| PRIORITY | 3 | | 2 | | 1 | | 0 | | 3 | | 2 | | 1 | | 0 | |
| COUNTER | RQ | CD | RQ | CD | RQ | CD | RQ | CD | RQ | CD | RQ | CD | RQ | CD | RQ | CD |
| ACTIVE | X | | X | X | X | | X | | X | X | X | | X | X | X | X |
| PR 3 REQ | +1 | | | +K | +K | | +K | | +1 | | +K | | | +K | | +K |
| PR 2 REQ | | | +1 | | +1 | | +1 | | | | +1 | | | +1 | | +1 |
| PR 1 REQ | | | | | +1 | | +1 | | | | | | +1 | | | +1 |
| PR 0 REQ | | | | | | | +1 | | | | | | | | +1 | |

METHOD OF PROVIDING EFFECTIVE PRIORITY ACCESS IN A DUAL BUS SYSTEM

This invention relates to a method of operating dual unidirectional and oppositely oriented buses and is particularly concerned with provision of effective priority access for stations along the buses.

A currently proposed subnetworking system for use in metropolitan area networks (MAN) is the distributed queue dual bus (DQDB) as defined in Proposed Standard: DQDB Metropolitan Area Network IEEE 802.6-89/45 Draft issued 7 Aug. 1989. The DQDB subnetwork consists of two oppositely oriented unidirectional buses and a plurality of stations distributed along the length of the buses. Communications between any two stations 1 and 2 on the buses uses one bus for information passing from 1 to 2 and the other bus for information passing from 2 to 1. The DQDB subnetwork offers two classes of communication for its stations. A first class is for synchronous traffic such as voice or video signals and a second class is for asynchronous traffic such as data communications. The bandwidth available for all traffic on the buses is divided between these two classes. The synchronous traffic is guaranteed a portion of this total bandwidth, with each station having a prearranged allocation of this total. The remaining available bandwidth is shared among stations based upon priority and position in a queue which is distributed across the buses, one distributed queue in each direction.

Each station is able to keep track of its position in the queue so that it knows when it may gain access to the bus to which the queue applies. In this way a substantially equal sharing of the bandwidth is provided for all stations. However, in a geographically large network, under certain conditions of heavy loading effectiveness of priority levels may be degraded. To overcome this problem, E. L. Hahne et al. of American Telephone and Telegraph in a contribution to the IEEE 802.6 Working Group and titled "Improving DQDB Fairness" dated Sept. 8, 1989, proposed a method in which any station using slots would be forced to pass a slot on for other stations to use for every given number of slots used.

This method shows considerable merit, however a problem with it was pointed out in a contribution to the IEEE 802.6 Working Group by Michael Spratt of Hewlett-Packard and titled "A Problem with the Multi-Priority Implementation of the Bandwidth Balancing Mechanism", dated Nov. 3, 1989. In a simulation, Spratt found that a station of low priority physically situated between two high priority stations, could still gain access to the bus and in so doing disrupt the balance of access between the two high priority stations.

The object of the present invention is to provide an improved method of operating a distributed queue dual bus.

In accordance with the present invention there is provided a method of providing priority access in a communications system comprising dual unidirectional and oppositely directed buses and stations connected therebetween, in which bandwidth is provided by slots and a first station passes slots to a second station on one bus and receives requests for useable slots from the second station via the other bus, the method comprising the steps of providing at each station a count for each of at least two priority levels, and at the first station, increasing or not one count in dependence upon priority level of request received, increasing the other count in response to each request, by more than any concurrent increase of the first count.

The invention will be further understood from the following description with reference to the drawings, in which:

FIG. 1 diagrammatically illustrates a known distributed queue dual bus subnetwork;

FIG. 2 diagrammatically illustrates a known slot format from the IEEE 802.6 proposed standard;

FIG. 3 diagrammatically illustrates upstream and downstream stations with respect to one of the buses of a known distributed queue dual bus;

FIG. 4 diagrammatically illustrates a known distributed queue dual bus having two priority levels for access;

FIG. 5 diagrammatically illustrates a distributed queue dual bus having four priority levels for access;

FIG. 8 illustrates in tabular form, incrementing the counters of the stations of FIG. 5 in accordance with a third embodiment of the present invention; and FIG. 9 illustrates in tabular form, incrementing the counters of the stations of FIG. 5 in accordance with a fourth embodiment of the present invention.

Figure 1:
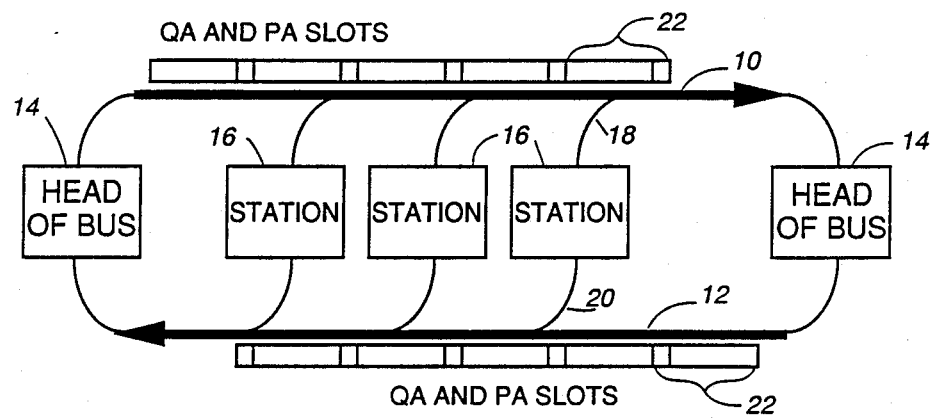
Figure 2:
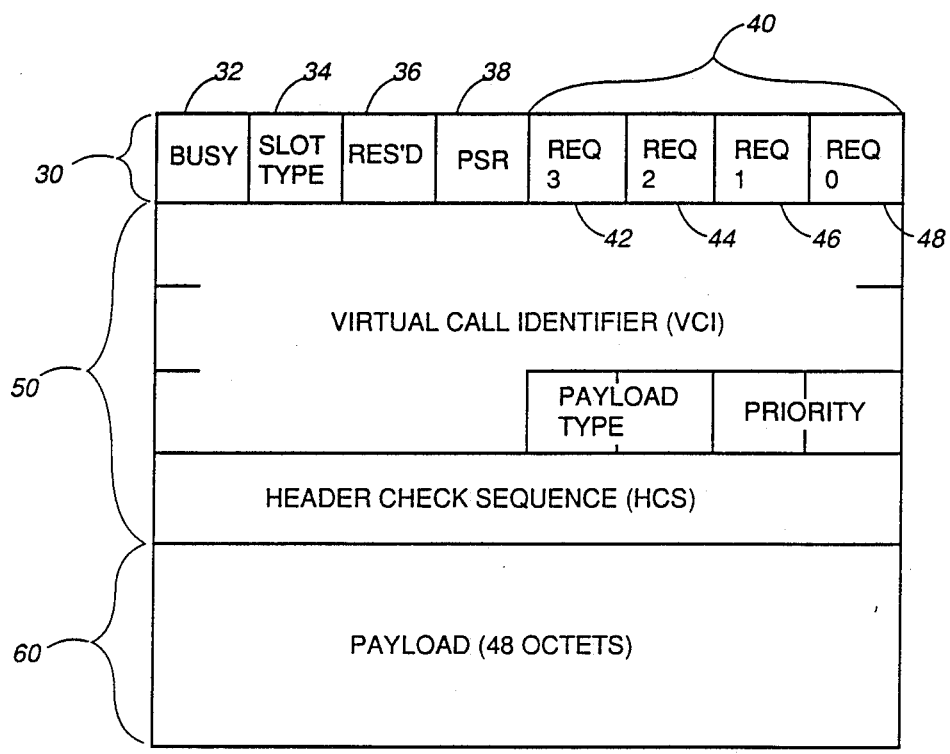

Referring to FIG. 1, there is illustrated in block diagram form a distributed queue dual bus (DQDB) subnetwork. The DQDB subnetwork includes unidirectional buses 10 and 12 which are oppositely oriented and heads of bus 14. The heads of bus 14 connect to the buses 10 and 12 for providing slots on one bus and for absorbing slots from the other bus. A plurality of stations 16 are distributed along the buses, each having an access 18 to bus 10 and an access 20 to bus 12. The heads of bus 14 generate time division multiplexed slots 22 in accordance with a format defined by the proposed standard. These slots effectively segment the bus capacity into pieces which are then made available to the stations for providing access to the bus. The format of these slots is diagrammatically illustrated in FIG. 2.

The slot, which is made up of serially transmitted bits is diagramed in rectangular form with a first bit being in an upper left hand corner and a last bit being in a lower right hand corner, and with intervening bits being ordered from left to right in rows, and with the rows ordered from top to bottom. The slot includes an 8-bit access control field (ACF) 30 including a 4-bit request field 40, a 4-octet (32-bit) segment header 50, and a 48-octet segment payload 60.

The access control field includes a busy bit 32, a slot type bit 34, a reserved bit 36 and a PSR bit 38. The request field 40 includes four request bits 42, 44, 46 and 48.

Of particular relevance to this invention are the busy bit 32 and the slot type bit 34 and the request bits 42, 44, 46 and 48.

In operation, the heads of bus 14 produce two types of slots: pre-arbitrated (PA) slots and queue arbitrated (QA) slots. A first type, the PA slot is used for synchronous traffic which requires a circuit switched like connection. Each head of bus 14 sets the busy bit 32 to a logic value 1 and the slot type to a logic value 1 to indicate a PA slot. The PA slot carries a virtual channel identifier which is recognized by the station allowed to make use of the slot. PA slots occupy a portion of the total capacity of the bus. The remaining capacity is provided by QA slots.

Each head of bus 14 provides a QA slot by setting the busy bit 32 and the slot type bit 34 to 0. Thus, each station needs to read only two bits to determine both the type of slot and whether that slot is busy or not. The PA slots represent prearranged bandwidth and are only available for use by the station for which they were generated. The QA slots by contrast, are shared among the stations along the bus. In the currently proposed standard, the sharing is accomplished through the use of a distributed queue.

Figure 3:
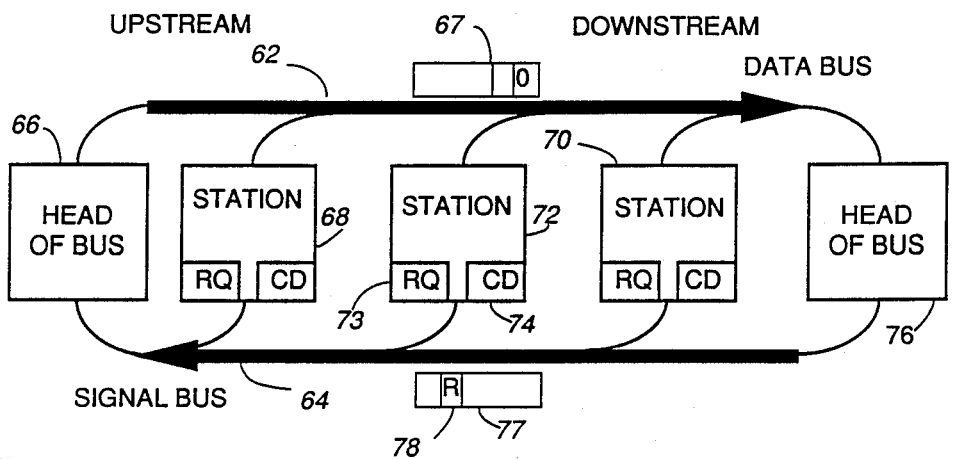

In FIG. 3 the DQDB bus is illustrated having a data bus 62 and a signal bus 64, reverse with respect to the bus 62, and heads of bus 66 and 76. Each head of bus 66 and 76 connects to the buses 62 and 64 for providing slots on one bus and for absorbing slots from the other bus. For simplicity of explanation, only the operation of one bus 62 will be discussed as a data bus, however, both buses 62 and 64 operate in the same manner. The head of bus 66 generates slots 67 on the forward bus 62 for transfer of data from upstream stations to downstream stations, a station 68 being the first station and a station 70 being the Nth station on the bus 62. A station 72 represents intervening stations along the bus. The head of bus 76 at the head of the bus 64 generates slots 77 in a reverse direction. The stations 70 and 72 use the signal bus 64 for transmitting requests to the stations upstream with respect to the direction of the bus 62. A request is sent by setting a request bit 78 in a slot 77 on the signal bus 64.

The proposed standard specifies four request bits, one for each of four levels of priority, however, for simplicity initially only a single request bit will be considered. Each station has two counters, a request counter RQ and a countdown counter CD. The request counter value is increased by 1 for each request passing the station on the signal bus 64. The countdown counter value, if it is not zero, is decreased by 1 for each empty QA slot passing the station on the data bus 62. Thus at any time every station knows how many outstanding requests there are for stations downstream of it. When the station 72 needs to send a data packet, it sends a request to the upstream stations represented by the station 68, by setting a request bit 78 in a slot 77 on the reverse bus 64, and at that time transfers the number in its request counter 73 to its countdown counter 74. The countdown counter 74 counter value CD is decreased by 1 for each empty QA slot passing on the data bus 62 until CD=0, at which time the station 72 transmits its packet in the next empty QA slot on the bus 62. Meanwhile the request counter 73 value RQ is reset to 0 after passing its count to the countdown counter 74 and continues to count the requests from downstream stations, e.g. station 70. The station 72 must wait until it has sent the first packet before it is able to send another request bit to queue a second packet to be sent.

As stated hereinabove, operation of the bus 64 as the data bus is the same. Thus each station maintains separate request and countdown counters for each of the two buses.

This system provides a very simple and effective method of distributing the bandwidth which is not prearranged. In this way a substantially equal sharing of the bandwidth is provided for all stations.

Figure 4:
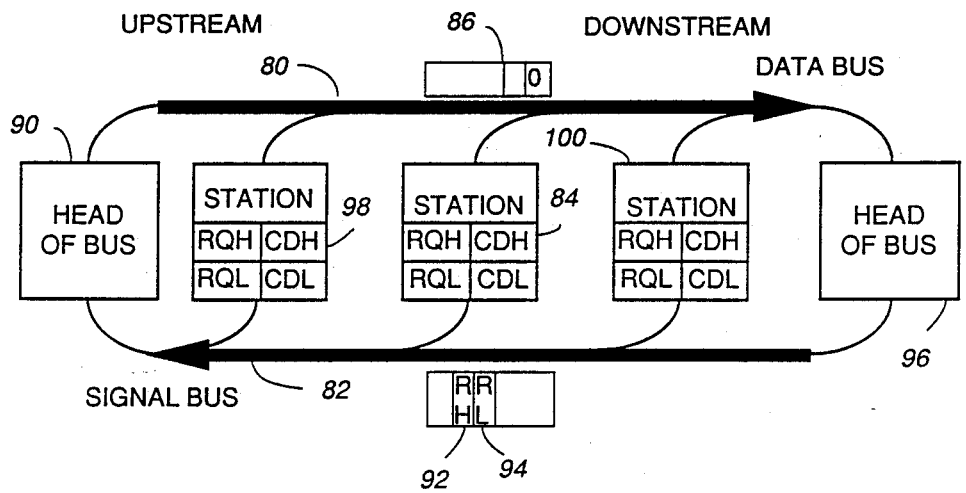

Referring to FIG. 4 there is illustrated a DQDB subnetwork having two levels of priority. As above only one direction of operation is discussed for convenience.

The DQDB subnetwork includes a data bus 80 which carries QA and PA slots in a first direction that can be referred to as downstream and a signal bus 82 which carries requests in a second (opposite) direction which can be referred to as upstream.

FIG. 4 illustrates a DQDB subnetwork in which each station has two request counters RQH and RQL and two countdown counters CDH and CHL, one of each type for each of two levels of priority.

Station 84, 98 and 100 are coupled to both buses 80 and 82. The DQDB subnetwork heads of bus 90 and 96 are connected to the buses 80 and 82, the head of bus 90 providing slots on the data bus 80 and absorbing slots from the signal bus 82.

For simplicity, only high and low priority are considered. According to the proposed DQDB standard, when multiple priority is used each RQ counter of the same priority level is incremented by one for each request passing on the signal bus, if the station has no queued segments, each RQ counter of lower priority level is incremented by one and if the station has queued segments, each CD counter of lower priority than the request is incremented by one. Thus, a higher priority request is queued ahead of any lower priority requests already in place.

In the present example, assume that the station 98 has high priority segments queued, thus its high priority CDH counter is active, and station 84 has low priority segments queued, thus its low priority CDL counter is active. A high priority request from station 100 increments the low priority CDL counter and the high priority RQH counter of the station 84 and subsequently, the high priority RQH counter of the station 98. A low priority request from station 100 increments the low priority RQL counters of the stations 84 and 98.

The priority scheme works under low to medium loading of the subnetwork, however there is growing evidence that in geographically large networks under certain heavy loading conditions, neither is access to the bus fairly divided nor is priority effective.

Consider a situation in which a station 98 near to the head of bus 90 becomes a heavy user of the slots available on the bus. Assume that the station 98 also has high priority segments to transmit. Under the proposed standard, station 98 can, in a short time period, monopolize the bus, because of its physical location. To overcome this problem, E. L. Hahne et al. of American Telephone and Telegraph in a contribution to the IEEE 802.6 Working Group and titled "Improving DQDB Fairness" dated Sept. 8, 1989, proposed a method in which, in the above case, the station 98 would be forced to pass a slot to downstream stations for every given number of slots used.

This method shows considerable merit, however a problem with it was pointed out in a contribution to the IEEE 802.6 Working Group by Michael Spratt of Hewlett-Packard and titled "A Problem with the Multi-Priority Implementation of the Bandwidth Balancing Mechanism", dated Nov. 3, 1989.

In the above case, suppose the station 84 has low priority segments queued to transmit and the station 100, which has been inactive, wishes to start transmitting high priority segments. The station 98 is being forced to allow one slot to pass for every eight it uses. This would allow the station 100 to send a slot of data and request a further slot, if the station 84 were not active. Under the standard a slot cannot be requested until one previously requested has been used. Eventually equilibrium would be reached between the two high priority stations 98 and 100. However, if the station 84 becomes active it can use most of the slots it receives, thereby reducing the access of station 100 despite its high priority. Simulation by Spratt has shown that an intervening station with low priority segments becoming active between two high priority stations can reduce the downstream high priority station's share of the bus bandwidth to about 10%, while attaining about 10% for itself. The remaining 80% of the bandwidth goes to the high priority station situated near to the head of bus. Thus the effectiveness of the priority of the station 100 has been degraded to that of the lowest level.

In accordance with the present invention an effectiveness factor K is introduced which, for example, allows the two high priority stations in the above situation to shut down the intervening low priority station.

In accordance with the invention, K is an integer greater than one. Preferably, K=m, where m is an integer constant greater than one (e.g. m=2, 3, . . . ). Alternatively, K=X−Y+1 where X is the priority of the request, Y is the priority of the counter and Y<X. Another alternative is K=m(X−Y).

In a first embodiment of the present invention the station counters are incremented as follows:

(a) Stations with no queued segments increment each RQ counter, of equal or lower priority than the request, by one.
(b) Stations with queued segments of same priority as request increment RQ counter by one.
(c) Stations with queued segments of lower priority than request increment CD counter by K.

Figures 5, 6, 7:
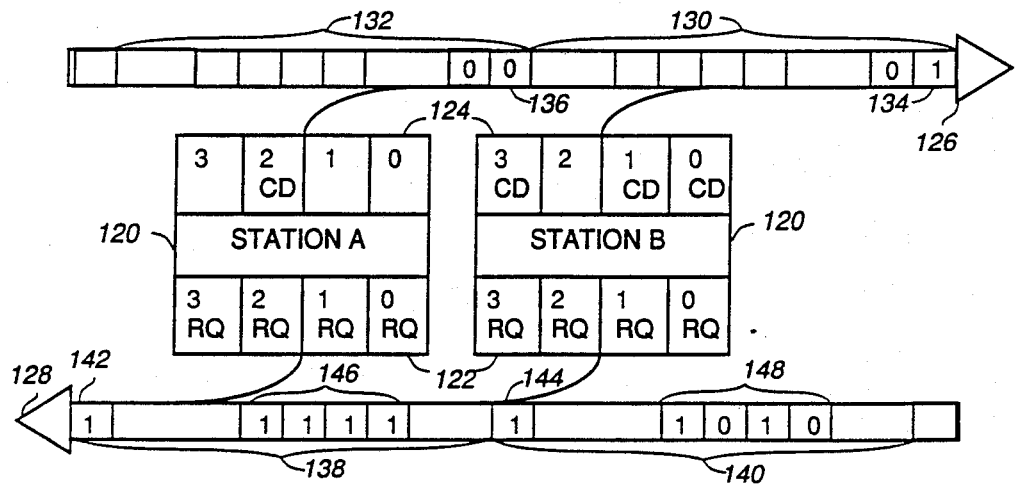
FIG. 6 illustrates in tabular form, incrementing the counters of the stations of FIG. 5 in accordance with a first embodiment of the present invention.
FIG. 7 illustrates in tabular form, incrementing the counters of the stations of FIG. 5 in accordance with a second embodiment of the present invention.

Referring to FIG. 5, there is illustrated a DQDB subnetwork including two stations 120 connected to buses 126 and 128. As above for simplicity only one direction of data transmission is considered. The buses 126 and 128 are considered a data bus and a signal bus respectively. Each of stations 120 has four request counters (RQ) 122, one for each of four priority levels 3 through 0, 3 being the highest level. Similarly, each of stations 120 has up to four countdown counters (CD) 124. A countdown counter of a given priority is active only when a segment of that priority is queued for transmission on the data bus 126. The active countdown counters are indicated in FIG. 5 by CD, while inactive counters are shown as blank. Thus, one of stations 120, that is a station A has its priority level 2 countdown counter active, and another of stations 120, that is a station B has its priority level 3, 1, and 0 countdown counters active.

The data bus 126 carries QA slots 130 and 132. The slot 130 has its busy bit 134 set to 1 and therefore it cannot decrement the CD counters of stations 120. The slot 132 has its busy bit 136 set to 0 and therefore can decrement the CD counters of stations 120 provided the busy bit 136 remains set to 0.

The signal bus 128 carries QA or PA slots 138 and 140. The slots 138 and 140 have their busy bits 142 and 144 set to 1 for illustration purposes only, as slot availability on the signal bus 128 is not being considered. The bits of interest in slots 138 and 140 on the signal bus 128 are the priority request bits 146 and 148. The slot 138 has all four priority request bits 146 set to 1, indicating that slots have been requested for each of the four available priority levels. The slot 140 has the four priority request bits 148 set in a pattern 1010, indicating that slots have been requested for priority levels 3 and 1.

Examples of the application of the method in accordance with a first embodiment of the present invention are illustrated in tabular form in FIG. 6. Two stations, station A and station B have queued segments at priority 2 and priorities 3, 1, and 0, respectively. The manner in which the counters are incremented upon receipt of a request is shown in rows for each of the four levels of priority. For example, station A has only priority 2 queued, hence only the level 2 CD counter for station A is active. The level 2 CD counter is incremented +K on receipt of a priority 3 REQ. The RQ counters of the station A are incremented in accordance with the proposed standard as described above in relation to FIG. 4.

The station B has CD counters active for priority levels 3, 1 and 0. For a request of priority level 3, the level 3 and 2 RQ counters are each incremented by 1, and the level 1 and 0 CD counters are each incremented by +K. For a request of priority level 2, the level 2 RQ counter is incremented by 1, and the level 1 and 0 CD counters are each incremented by +K. For a request of priority level 1, the level 1 RQ counter is incremented by 1, and the level 0 CD counter is incremented by +K. For a request of priority level 0, the level 0 RQ counter is incremented by 1.

Examples of the application of the method in accordance with a second embodiment of the present invention are illustrated in tabular form in FIG. 7. Stations A and B have the same counters active as in FIGS. 5 and 6 and receive the same requests as in FIG. 6. In accordance with the second embodiment the lower priority RQ counters are also incremented by the factor K.

For example, station A has only priority 2 queued, hence only the priority 2 CD counter for station B is active. The level 3 RQ counter is incremented by 1, the level 2 CD counter is incremented by K and the level 1 and 0 RQ counters are each incremented by +K on receipt of a priority 3 REQ. The level 2 RQ counter is incremented by 1 and the level 1 and 0 RQ counters are each incremented by +K on receipt of a priority 2 REQ. The level I RQ counter is incremented by 1 and the level 0 RQ counter is incremented by +K on receipt of a priority 1 REQ. The level 0 RQ counter is incremented by 1 on receipt of a priority 0 REQ.

The station B has CD counters active for priority levels 3, 1 and 0. For a request of priority level 3, the level 3 RQ counter is incremented by 1, the level 2 CD counter is incremented by +K and the level 1 and 0 CD counters are each incremented by +K. For a request of priority level 2, the level 2 RQ counter is incremented by 1, and the level 1 and 0 CD counters are each incremented by +K. For a request of priority level 1, the level 1 RQ counter is incremented by 1 and the level 0 CD counter is incremented by +K. For a request of priority level 0, the level 0 RQ counter is incremented by 1.

The methods of the first and second embodiments may be applied to singular or multiple requests (i.e. more than one REQ bit set in a given slot on the signal bus). The multiple requests can be handled one at a time as described above.

Alternatively, for multiple requests the effectiveness factor can be applied only for the highest priority level. In FIG. 8, assume that priorities 3 through 0 REQs arrive in one slot, that is simultaneously. In accordance with a third embodiment of the present invention, lower priority CD counters are incremented by K only for the highest priority request in the slot, in this case priority 3. For example, station A has only priority 2 queued, hence only the level 2 CD counter for station A is active. The level 2 CD counter is incremented by +K on receipt of a priority 3 REQ. The RQ counters of the station A are incremented in accordance with the standard as described above in relation to FIG. 4.

The station B has CD counters active for priority levels 3, 1 and 0. For a request of priority level 3, the level 3 and 2 RQ counters are each incremented by 1, and the level 1 and 0 CD counters are each incremented by +K. For the remaining requests, the RQ and CD counters are incremented in accordance with the proposed standard as described above in relation to FIG. 4.

A fourth embodiment also increments lower priority RQ counters by the factor K only for the highest priority request in the slot, as shown in FIG. 9.

For example, station A has only priority 2 queued, hence only the level 2 CD counter for station A is active. The level 2 CD counter is incremented by +K and the level 1 and 0 RQ counters are each incremented by +K on receipt of a priority 3 REQ. For requests of priority level 2, 1 and 0, the level 2, 1 and 0 RQ counters of the station A are incremented in accordance with the standard as described above in relation to FIG. 4.

The station B has CD counters active for priority levels 3, 1 and 0. For a request of priority level 3, the level 3 RQ counter is incremented by 1, and the level 2 RQ and level 1 and 0 CD counters are each incremented by +K. For the remaining requests, the RQ and CD counters are incremented in accordance with the proposed standard as described above in relation to FIG. 4.

The effectiveness factor causes stations with low priority traffic to pass up more empty slots by making the queue appear longer than it really is. In the situation described above, the two heavy users at the highest priority level would be able to shut down the lower priority station between them.

The use of the effectiveness factor may cause some waste of bus bandwidth by forcing lower priority stations to pass slots to higher priority stations which may not use all of them. A variation of the four embodiments described above controls the application of the effectiveness factor using an additional counter for each of the level 2, 1, and 0 priorities. These counters act as threshold counters. Each counts the number of higher priority requests received by the station. After a predetermined number has been reached, a threshold, the threshold counter resets to zero and the appropriate CD or RQ counters would be incremented in accordance with the four embodiments described above. Thus the effectiveness factor K would only be applied after a threshold number of higher priority requests had been received.

An advantage of the present invention is providing a simple method of ensuring the effectiveness of priority.

Numerous other modifications, variations and adaptations may be made to the particular embodiments of the invention described above without departing from the scope of the invention as claimed.

What is claimed is:

1. A method of providing priority access in a communications system comprising dual unidirectional and oppositely directed buses and stations connected therebetween, in which bandwidth is provided by slots and a first station passes slots to a second station on one bus and receives requests for useable slots from the second station via the other bus, the method comprising the steps of:
   providing at each station a count for each of at least two priority levels; and
   at the first station, increasing or not one count in dependence upon priority level of request received, increasing the other count in response to each request, by more than any concurrent increase of the first count.

2. A method as claimed in claim 1 wherein the other count is increased by more than one for each request of higher priority level.

3. A method as claimed in claim 2 wherein the other count is increased by more than one only when a segment of the priority level of the other count is queued for transmission.

4. A method as claimed in claim 3 wherein the more than one increase of the other count is K, where K is an integer greater than one.

5. A method as claimed in claim 4 wherein K is defined by $K = X - Y + 1$, where X is the priority level of the request and Y is the priority level of the count.

6. A method as claimed in claim 4 wherein K is defined by $K = m(X - Y)$, where X is the priority level of the request, Y is the priority level of the count and m is an integer greater than one.

7. A method as claimed in claim 1 wherein on receiving concurrent requests, the other count is increased by more than one for only a highest priority level.

8. A method as claimed in claim 7 wherein the other count is increased by more than one only when a segment of the priority level of the other count is queued for transmission.

9. A method as claimed in claim 8 wherein the more than one increase of the other count is K, where K is an integer greater than one.

10. A method as claimed in claim 9 wherein K is defined by $K = X - Y + 1$, where X is the priority level of the request and Y is the priority level of the count.

11. A method as claimed in claim 9 wherein K is defined by $K = m(X - Y)$, where X is the priority level of the request, Y is the priority level of the count and m is an integer greater than one.

* * * * *